United States Patent
Boccon-Gibod et al.

(10) Patent No.: US 12,229,283 B2
(45) Date of Patent: *Feb. 18, 2025

(54) SECURE PROCESSING SYSTEMS AND METHODS

(71) Applicant: Intertrust Technologies Corporation, Milpitas, CA (US)

(72) Inventors: Gilles Boccon-Gibod, San Francisco, CA (US); Gary F. Ellison, San Mateo, CA (US)

(73) Assignee: Intertrust Technologies Corporation, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/495,161

(22) Filed: Oct. 26, 2023

(65) Prior Publication Data

US 2024/0054238 A1     Feb. 15, 2024

Related U.S. Application Data

(63) Continuation of application No. 18/148,085, filed on Dec. 29, 2022, now Pat. No. 11,816,230, which is a
(Continued)

(51) Int. Cl.
  *G06F 21/60*    (2013.01)
  *G06F 21/10*    (2013.01)
  (Continued)

(52) U.S. Cl.
  CPC .......... *G06F 21/602* (2013.01); *G06F 21/105* (2013.01); *G06F 21/6218* (2013.01);
  (Continued)

(58) Field of Classification Search
  CPC .. G06F 21/602; G06F 21/105; G06F 21/6218; G06F 2221/2149; H04L 9/088;
  (Continued)

(56) References Cited

U.S. PATENT DOCUMENTS 5,715,403 A    2/1998   Stefik
5,892,900 A    4/1999   Ginter et al.
(Continued)

OTHER PUBLICATIONS

Office Action mailed Aug. 21, 2013, in related U.S. Appl. No. 13/163,244, filed Jun. 17, 2011.
(Continued)

*Primary Examiner* — Ayoub Alata
(74) *Attorney, Agent, or Firm* — Finnegan, Henderson, Farabow, Garrett & Dunner, LLP

(57) ABSTRACT

This disclosure relates to systems and methods for enabling the use of secret digital or electronic information without exposing the sensitive information to unsecured applications. In certain embodiments, the methods may include invoking, by a client application executing in an open processing domain, a secure abstraction layer configured to interface with secret data protected by a secure processing domain. Secure operations may be securely performed on the secret data by the secure abstraction layer in the secure processing domain based on an invocation from a client application running in the open processing domain.

18 Claims, 5 Drawing Sheets

Related U.S. Application Data continuation of application No. 17/193,299, filed on Mar. 5, 2021, now Pat. No. 11,544,391, which is a continuation of application No. 16/676,587, filed on Nov. 7, 2019, now Pat. No. 10,949,550, which is a continuation of application No. 16/277,372, filed on Feb. 15, 2019, now Pat. No. 10,949,549, which is a continuation of application No. 15/166,025, filed on May 26, 2016, now Pat. No. 10,255,440, which is a continuation of application No. 14/509,376, filed on Oct. 8, 2014, now Pat. No. 9,369,280, which is a continuation of application No. 13/163,244, filed on Jun. 17, 2011, now Pat. No. 8,874,896.

(60) Provisional application No. 61/356,524, filed on Jun. 18, 2010.

(51) Int. Cl.
*G06F 21/62* (2013.01)
*H04L 9/08* (2006.01)
*H04L 9/32* (2006.01)

(52) U.S. Cl.
CPC ............ *H04L 9/088* (2013.01); *H04L 9/0897* (2013.01); *H04L 9/3247* (2013.01); *G06F 2221/2149* (2013.01); *H04L 2209/127* (2013.01); *H04L 2209/603* (2013.01)

(58) Field of Classification Search
CPC ................. H04L 9/0897; H04L 9/3247; H04L 2209/127; H04L 2209/603
See application file for complete search history.

(56) References Cited

U.S. PATENT DOCUMENTS

| | | | |
|---|---|---|---|
| 5,920,861 A | 7/1999 | Hall et al. | |
| 5,943,422 A | 8/1999 | Van Wie et al. | |
| 5,982,891 A | 11/1999 | Ginter et al. | |
| 6,112,181 A | 8/2000 | Shear et al. | |
| 6,157,721 A | 12/2000 | Shear et al. | |
| 6,185,683 B1 | 2/2001 | Ginter et al. | |
| 6,658,568 B1 | 12/2003 | Ginter et al. | |
| 7,107,448 B1 | 9/2006 | MacKay et al. | |
| 7,152,165 B1 | 12/2006 | Maheshwari et al. | |
| 7,213,266 B1 | 5/2007 | Maher et al. | |
| 7,406,603 B1 | 7/2008 | MacKay et al. | |
| 7,689,827 B2 | 3/2010 | Sibert | |
| 7,930,360 B2 | 4/2011 | Sibert | |
| 8,234,387 B2 | 7/2012 | Bradley et al. | |
| 8,526,610 B2 | 9/2013 | Shamoon et al. | |
| 2004/0039924 A1* | 2/2004 | Baldwin | H04L 9/0891 713/189 |
| 2005/0010752 A1* | 1/2005 | Solsona | G06F 21/57 713/151 |
| 2006/0277122 A1 | 12/2006 | Shear et al. | |
| 2007/0180519 A1 | 8/2007 | Boccon-Gibod et al. | |
| 2008/0189757 A1* | 8/2008 | Schackow | H04L 63/20 726/1 |
| 2009/0019549 A1* | 1/2009 | Reid | G06F 21/6209 726/27 |
| 2009/0055612 A1* | 2/2009 | Sibert | G06F 12/145 711/E12.091 |
| 2009/0193262 A1* | 7/2009 | Sweazey | H04L 9/08 713/182 |
| 2010/0054481 A1* | 3/2010 | Jajodia | H04L 9/0897 380/283 |
| 2011/0289546 A1 | 11/2011 | Pieczul et al. | |
| 2011/0289556 A1* | 11/2011 | Pieczul | G06F 21/53 726/3 |

OTHER PUBLICATIONS

Office Action mailed Dec. 4, 2013, in related U.S. Appl. No. 13/163,244, filed Jun. 17, 2011.

Notice of Allowance mailed Jul. 17, 2014, in related U.S. Appl. No. 13/163,244, filed Jun. 17, 2011.

Office Action mailed Oct. 7, 2015, in related U.S. Appl. No. 14/509,376, filed Oct. 8, 2014.

Notice of Allowance mailed Feb. 17, 2016, in related U.S. Appl. No. 14/509,376, filed Oct. 8, 2014.

Office Action mailed Sep. 19, 2018, in related U.S. Appl. No. 15/166,025, filed May 26, 2016.

Notice of Allowance mailed Nov. 27, 2018, in related U.S. Appl. No. 15/166,025, filed May 26, 2016.

Notice of Allowance mailed Nov. 20, 2020, in related U.S. Appl. No. 16/277,372, filed Feb. 15, 2019.

Notice of Allowance mailed Nov. 6, 2020, in related U.S. Appl. No. 16/676,587, filed Nov. 7, 2019.

\* cited by examiner

SECURE PROCESSING SYSTEMS AND METHODS

RELATED APPLICATIONS

This application is a continuation of U.S. patent application Ser. No. 18/148,085, filed Dec. 29, 2022, which is a continuation of U.S. patent application Ser. No. 17/193,299, filed Mar. 5, 2021 (now U.S. Pat. No. 11,544,391), which is a continuation of U.S. patent application Ser. No. 16/676,587, filed Nov. 7, 2019 (now U.S. Pat. No. 10,949,550), which is a continuation of U.S. patent application Ser. No. 16/277,372, filed Feb. 15, 2019 (now U.S. Pat. No. 10,949,549), which is a continuation of U.S. patent application Ser. No. 15/166,025, filed May 26, 2016 (now U.S. Pat. No. 10,255,440), which is a continuation of U.S. patent application Ser. No. 14/509,376, filed Oct. 8, 2014 (now U.S. Pat. No. 9,369,280), which is a continuation of U.S. patent application Ser. No. 13/163,244, filed Jun. 17, 2011 (now U.S. Pat. No. 8,874,896), which is based upon and claims priority under 35 U.S.C. § 119(e) to U.S. Provisional Patent Application No. 61/356,524, filed Jun. 18, 2010, and entitled "SECURE PROCESSING SYSTEMS AND METHODS," all of which are hereby incorporated by reference in their entireties.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND AND SUMMARY

The present disclosure relates generally to systems and methods for the secure processing of digital or electronic information. More specifically, the present disclosure relates to systems and methods for enabling the use of secret digital or electronic information without exposing the sensitive information to unsecured applications.

Computer systems are commonly used to store and process digital information that a user may wish to keep secret or secure. For example, a user may wish to prevent secret information related to their identity, financial accounts, passwords, and the like from being accessed by and/or exposed to potential attackers who may desire to exploit such secret information. Further, information (e.g., cryptographic keys, certificates, licenses, control programs, etc.) utilized in digital rights management ("DRM") implementations designed to prevent unauthorized access and/or use to secure and/or proprietary content may also need to be kept secret to maintain the integrity of the DRM implementation. Accordingly, systems and methods to manage the processing of secret information by a computer system in a secure manner are desirable.

To prevent unauthorized access to and/or exposure of secret or secure information, a processing environment may be established on a computer system having a plurality of processing domains with different levels of security. For example, a secure processing domain may be established where secret information is securely processed and protected from exposure to applications executing outside the secure processing domain. An open processing domain may be established where less-sensitive and/or less-secure operations and applications may be performed and/or executed. Potential attackers may gain access to the open processing domain by virtue of its less secure nature, but will be substantially impeded from accessing the secret or secure information processed within the secure processing domain given its higher level of security.

In some circumstances, applications running in the open processing domain may need to use secret information protected within the secure processing domain. Consistent with embodiments disclosed herein, a secure programmatic abstraction layer may operate as a boundary between the secure processing domain and the open processing domain allowing applications running in the open processing domain to utilize secret information protected within the secure processing domain without compromising the security of the secret information. The secure programmatic abstraction layer may be invoked by the application running in the open processing domain and used to perform required operations on the secret information in a secure environment.

Secure operations performed on and/or using secret information consistent with embodiments disclosed herein may initate when a client application executing in an open processing domain of a system invokes a secure abstraction layer. The secure abstraction layer may be configured to interface with secret data protected by a secure processing domain of the system. In some embodiments, the secure processing domain may include a secure processor unit having integrated support for symmetric and asymmetric cryptographic algorithms Further, in certain embodiments, before invoking the secure abstraction layer, the system may determine that the secure abstraction layer is trusted. Determining that the secure abstraction layer is trusted may be based on, for example, a successful signature verification operation.

Once invoked, the secure abstraction layer may perform one or more secure operations on the secret information based on an invocation from a client application. The secure operations may include, for example, loading a cryptographically wrapped key into the secure abstraction layer, performing encryption/decryption operations utilizing the secret information, performing cryptographic signing and/or signature verification utilizing the secret information, encrpyting secret fields within a larger piece of data utilizing the secret information, and/or performing digest calculations. By performing secure operations in the secure processing domain, the secret information may not be exposed to the less-secure client application running the open processing domain.

In certain embodiments, secret information may be exported and/or persisted from the secure processing domain in a secure manner. To export or persist secret information, the secret information may first be encrypted using a persistent (e.g., permanent) encrpytion key. In certain embodiments, the persistent encrpytion key may be associated with hardware components of the secure processing domain and be configured to persist between system reboots. The secret information may, in addition or alternatively, be encrpyted using a cycling encrpytion key that may not be configured to persist between system reboots. Once encrpyted by the persistant and/or cycling encryption key, the secret information may then be exported from the secure abstraction layer to the client application running in the open processing domain.

BRIEF DESCRIPTION OF THE DRAWINGS

The inventive body of work will be readily understood by referring to the following detailed description in conjunction with the accompanying drawings, in which.

DETAILED DESCRIPTION

Figure 1:
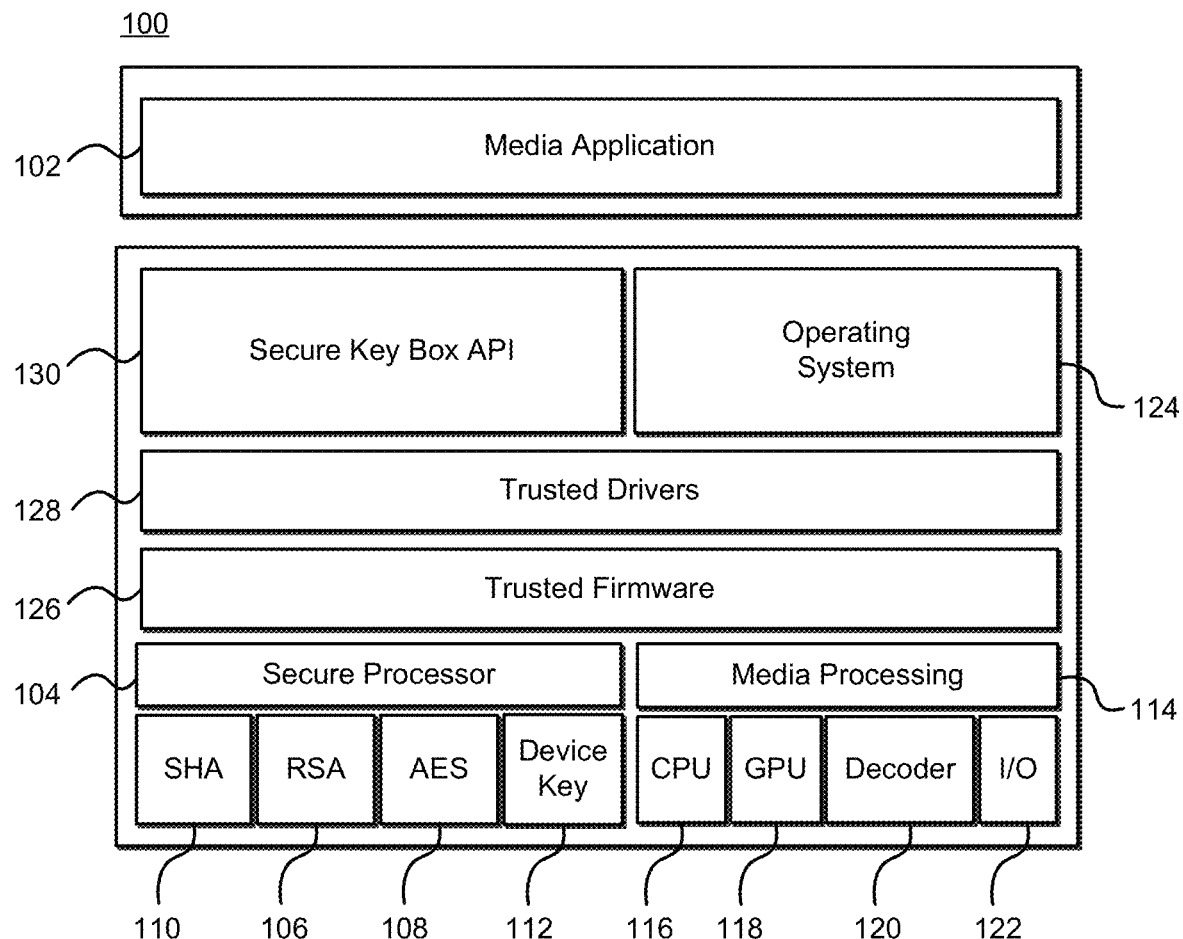
FIG. 1 illustrates an exemplary system architecture for a media application deployed on an embedded device consistent with embodiments of the present disclosure.

A detailed description of the systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Systems and methods are presented for facilitating the secure processing of secret, proprietary, and/or other information (e.g., secure electronic content). In certain embodiments, the systems and methods described herein can, for example, be used in connection with digital rights management ("DRM") technologies such as that described in commonly assigned, co-pending U.S. patent application Ser. No. 11/583,693, filed Oct. 18, 2006 ("the '693 application"), and/or service orchestration technologies such as those described in commonly assigned U.S. patent application Ser. No. 10/863,551 ("the '551 application")(the contents of both the '693 application and the '551 application hereby being incorporated by reference in their entireties) as well as in other contexts. It will be appreciated that these systems and methods are novel, as are many of the components, systems, and methods employed therein.

DRM engines (e.g., such as those described in the '693 application) and other software can benefit from leveraging the security and/or media acceleration functionality of certain system on a chip ("SoC") based devices. Leveraging integral secure components of a SoC can simplify and optimize the development process, especially with respect to achieving compliance with security and robustness rules of a particular content protection implementation.

Embodiments of the systems and methods described herein can be used to provide a minimal programmatic abstraction layer that confines the handling of secret information (e.g., cryptographic keys) to a relatively small and verifiable secure code module. Depending on the system architecture, this secure code module may directly interact with a secure processor integrated on the SoC operating in a secure processing domain. With this level of integration, cryptographic keys and other secret information can be isolated from applications running on a general purpose CPU integrated on the SoC operating in an open processing domain, and be protected from exposure to potential attackers by the security processor. Secret information (e.g., cryptographic keys) may only be exposed within the protected memory space of the security processor (i.e., within the secure processing domain), and encryption, decryption, signing, and verification functions may be executed on the security processor. By preventing the secret information from being exposed to the general purpose CPU and/or the open processing domain, the security of the secret information may be maintained.

Device makers may benefit from this approach by limiting their porting effort to mapping the native security functionality of their platform under this abstraction layer. This may allow the port to be completed with only minimal knowledge of the content protection system being deployed. In the case of SoC based systems that include an integral secure processor, the effort needed to harden the system so as to comply with desired or mandated robustness requirements may be simplified.

To implement a secure and robust DRM system (e.g., embodiments of the DRM system described in the '693 application) and/or other content protection systems, only basic and commonly supported security capabilities may be required. From these basic primitives, higher-level functions can be implemented that may provide consistent behavior across different underlying hardware architectures. For example, in some embodiments, the basic security capabilities of the underlying platform might include a secret device key (e.g., a symmetric or asymmetric secret device key), basic cryptographic primitives, and/or an integrity protected bootstrap.

Secure Key Box ("SKB")

In certain embodiments, an application programming interface ("API") is provided, an abstraction of which may be an SKB configured to operate as a secure programmatic abstraction layer. The SKB may be realized by the presence of a secured secret device key (or keys) that, in certain embodiments, may be referred to as a Master Key. In some embodiments, the Master Key may be securely embedded in a hardware security element (e.g., One Time Programmable ["OTP"] memory) such as a SoC or Trusted Platform Module ("TPM"). In some embodiments, the Master Key may comprise a white-box cipher key, or other type of key that is sufficiently protected so as to act as a root of trust used to enable the secure marshalling of other keys and credentials into the Secure Key Box.

In one embodiment, when a device boots, or prior to loading a DRM (and/or other relevant) software application, the SKB software code module may be verified to determine if it is trusted. The mechanism by which this is accomplished can be a platform specific function. In certain embodiments, verification of whether the SKB software code module is trusted may be performed through signature verification of the SKB software module. In certain embodiments, having a Master Key embedded within a hardware security module (e.g., SoC or TPM) enables this verification step to be very robust.

In some embodiments, the Master Key can be used directly to verify the integrity of the code, while in other embodiments, a more flexible approach can be employed, in which the Master Key can be used to marshal an integrity-protected trust anchor or a confidentiality-protected symmetric key from a secondary storage (e.g., non-volatile random-access memory ("NVRAM")). This technique of storing secrets and trusted information may be referred to as a Vault. Once this trust anchor or key has been securely loaded from secondary storage, it can then be used by a integrity protected bootstrap to verify the signature over the SKB code module.

Other than the secure storage of the Master Key, some embodiments of an SKB need no additional secure storage, and may rely on a Vault to securely store any trusted data that may be necessary in secondary storage. That is, in such embodiments, secret and trusted information may be stored in secondary storage so long as the information at rest is protected by the Master Key or some other key that is confidentiality protected by the Master Key.

In one embodiment, the SKB API provides an interface in support of the following functions:
  Load a wrapped key
  Encrypt/Decrypt data using a loaded key
  Sign/Verify data using a loaded key
  Digest data Loading Keys In certain embodiments, an SKB can be used to enable an application executing in an open processing domain to use cryptographic keys without directly exposing the value of the cipher key to the application (i.e., keeping the value of the cipher from being exposed in the clear or the open processing environment). The SKB API may provide a mechanism to load cryptographically wrapped keys (e.g., keys encrypted with another key) into the SKB and then to use the loaded key in cryptographic operations. The first key loaded into the SKB may be unwrapped with the Master Key and other keys can be then loaded and unwrapped accordingly.

In some embodiments, the SKB API may expose common cryptographic methods to encrypt/decrypt, sign/verify and digest buffers that may possibly include secret data to applications executing in the open processing domain. In some embodiments, the SKB implementation may support one or more cryptographic algorithms. For example, the SKB implementation may support one or more of the following cryptographic algorithms:
  RSA 1.5 encryption/decryption, sign/verify
  AES 128 encryption/decryption in electronic codebook ("ECB") mode
  SHA1/SHA256 digest The SKB API may implement additional cipher modes of operation such as cipher-block chaining ("CBC") and counter ("CTR"). In certain embodiments, given their inherent security, these cipher modes could be safely implemented outside of the SKB in an open processing domain. It will be appreciated that the aforementioned algorithms are just examples, and that any suitable algorithm(s) could be supported.

SoC Based System Architecture

FIG. 1 illustrates an exemplary SoC architecture 100 for a media application 102 deployed on an embedded device consistent with embodiments of the present disclosure. In certain embodiments, the media application 102 may execute in the clear in an open processing domain. The architecture 100 may further include a secure processor 104 operating in a secure processing domain. In certain embodiments, the secure processor 104 may include built-in cryptographic support for symmetric, asymmetric and digest algorithms including, for example, RSA 1.5 encryption/decryption sign/verify 106, AES 128 encryption/decryption 108, and SHA1/SHA256 digest 110. The architecture 100 may further include at least one device key 112 (i.e., a Master Key) that is not exposed outside of the secure processing domain. In certain embodiments, the secure processing domain and/or the secure processor 104 may support a key ladder that is rooted at this device key 112.

The system architecture 100 may further include media processing blocks 114 that may incorporate a central processing unit ("CPU") 116, a graphics processing unit ("GPU") 118, decoder 120, and input/output ("I/O") 122 functionality. An operating system ("OS") 124 may also be included to manage and coordinate in part system hardware resources and provide for common services for execution of various applications.

Firmware 126 may be included that can supply the SoC specific interfaces to the media 114 and security 104 processing components. In certain embodiments, this firmware 126 may be trusted. In some embodiments, the SoC boot sequence may verify the integrity and authenticity of the firmware 126. The security 104 and media 114 processing components may be exposed to applications (e.g., media application 102) by the operating system 124 as devices. Drivers 128, that may be trusted, can be configured to interface with these devices. Additional trusted software components included in the system architecture 100 may include an SKB and a DRM client binary. In certain embodiments, mechanisms may be included to verify the integrity and trustworthiness of these components. In some embodiments, the system architecture 100 integrates some degree of sandboxing that may ensure that unauthorized applications cannot access secure resources including, for example, system memory or a media-processing pipeline.

Secure Key Box API

As discussed above, a secure programmatic abstraction layer may function as an SKB API 130. Consistent with some embodiments, the SKB API 130 may provide a simple programmatic interface to enable the use of cryptographic keys without exposing this sensitive information to a calling application operating in an open processing domain (e.g., media application 102). For example, in one embodiment, the SKB API 130 supports common cryptographic functions such as unwrapping a key inside the SKB and then using this key to decrypt bulk data within the secure environment of the SKB.

SKB_Engine

An SKB_Engine object may be initialized via an SKB API 130 that represents an instance of a secure processor engine that can manage and operate on secret data (e.g., cryptographic keys and the like). In certain embodiments, the secret data may not otherwise be accessed by a calling application. A client application may execute a calling operation to obtain an SKB_Engine and a releasing operation to release the SKB_Engine. In some embodiments, an SKB_Engine may provide at least the following categories of functionality:
  Providing information about the SKB_Engine
  Creating SKB_Secure data objects
  Creating objects providing cryptographic functionality (e.g., SKB_Transform objects and SKB_Cipher objects)

In some embodiments, the abstractions exposed by the SKB API 130 may include SKB_SecureData, SKB_Transform, and SKB_Cipher objects. Exemplary SKB_Engine methods relating to these abstractions may include:

| | |
|---|---|
| SKB_Engine_CreateCipher | Creates an SKB_Cipher Object |
| SKB_Engine_CreateDataFromExported | Creates an SKB_SecureData object from previously exported data |

| | |
|---|---|
| SKB_Engine_CreateDataFromWrapped | Creates an SKB_SecureData object for data resulting from unwrapping (e.g., decrypting) previously wrapped data, or for data that was not wrapped |
| SKB_Engine_CreateTransform | Creates an SKB_Transform object |
| SKB_Engine_GetDataByName | Creates an SKB_SecureData object for data referenced by name |
| SKB_Engine_GetInfo | Obtains information about the engine, such as its major and minor version numbers |
| SKB_Engine_GetInstance | Obtains an SKB_Engine instance |
| SKB-Engine_Release | Releases the SKB_Engine object |

SKB_SecureData

An SKB_SecureData object may allow a calling application to refer to and operate on data ensconced, secured and protected within the SKB that may not otherwise be accessed by the calling application (e.g., cipher keys or arbitrary byte sequences). In one embodiment, SKB_Secure Data objects may be named so that a calling application can locate a specific secret within the SKB. For example, an application can query the SKB for the Master Key 112 by its name (e.g. "OTPKey0") so that it can load and unwrap cryptographic key material that may be stored external to the SoC.

In some embodiments, an SKB_SecureData object can be created for each secret data to be operated on by the SKB. In certain embodiments, to create an SKB_SecureData object, an appropriate SKB_Engine method may be called. For example, calling SKB_Engine_CreateDataFromWrapped may create an SKB_SecureData object that represents secret data created from unwrapping (i.e., decrypting) specified cryptographically wrapped data.

As described above, an SKB_SecureData object may be used to represent secret data having values that are not exposed to client applications executing in an open processing environment but can be operated on by the SKB API implementation 130. Client applications may ask for data characteristics of secret data referenced by an SKB_SecureData object, such as its size in bites and its type, and can call the SKB API 130 to operate on the secret data. Client applications may further reference secret data within the SKB via an SKB_SecureData object. Methods relating to SKB_SecureData objects may include:

| | |
|---|---|
| SKB_SecureData_Derive | Derives a new SKB-SecureData object from an existing one |
| SKB_SecureData_Export | Exports the data represented by the SKB_SecureData object to a protected form |
| SKB_SecureData_GetInfo | Retrieves information about the secret data represented by the SKB_SecureData object |
| SKB_SecureData_Release | Releases the SKB_SecureData object |

Figure 2:
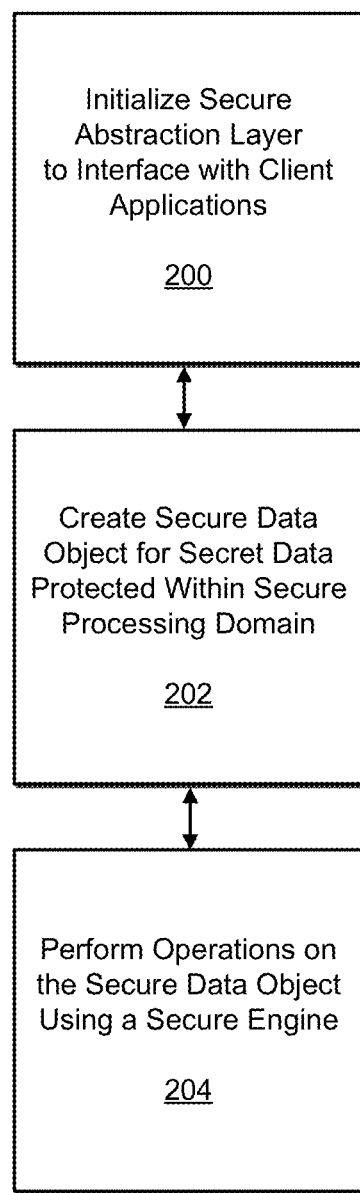
FIG. 2 illustrates a method for performing secure operations on secret data consistent with embodiments of the present disclosure.

FIG. 2 illustrates a general method for performing secure operations on secret data consistent with embodiments of the present disclosure. A secure abstraction layer (e.g., the SKB) may be initialized 200 operating in a secure processing domain. The secure abstraction layer may operate to allow an unsecured calling application to refer to and operate on data protected within the secure processing domain (e.g., in an SKB) that the calling application may not otherwise access. A secure data object may be created 202 that, in certain embodiments, references secret data protected within the secure processing domain (e.g., within the SKB). Using a secure engine called by the client application through the secure abstraction layer, operations and other methods may be performed on the secure data object 204 without exposing the secure data outside the secure processing domain and/or secure abstraction layer.

Exporting and Persisting SKB_SecureData

In some embodiments, SKB_SecureData can be persisted. For example, if a client application needs some secret data to be persistent, so that it is available across reboots and/or resets, or if the client application wishes the secret data to be available outside the secure processing domain, the client application may ask the SKB API 130 for a protected form of the secret data that can be exported or persistently stored, since client applications may not obtain the secret data bytes in the clear. When the persisted data is needed later, the client application may request to have the exported or persisted data "imported" (e.g., unencrypted) and, in certain embodiments, referenced by a new SKB_SecureData object.

In certain embodiments, persisting SKB_SecureData across reboots and/or resets returns a serialized form of the SKB_SecureData object encrypted using a permanent key (e.g., Master Key 112 or a derivative thereof). In some embodiments, this persisted serialized form will be an encrypted representation of the secret data. Using a built-in permanent key (e.g., the Master Key 112 or a derivative thereof) that the SKB API 130 implementation supports, the persisted encrypted representation can be unwrapped upon a restart.

In some embodiments, upon boot or the first time an SKB-Engine is created after a boot, the SKB API 130 may generate a random number called a transient export key. When the SKB API 130 is called by a client application to export data outside the secure processing domain that does not need to be persistent across reboot, a serialized form of the SKB_SecureData may be created. For example, data to be exported, along with information regarding the data type, size, and the like may be exported after encryption by the transient export key. Later, when the client application requests that the exported data be imported back into the SKB, the transient export key may be used to decrypt the exported data.

Figure 3:
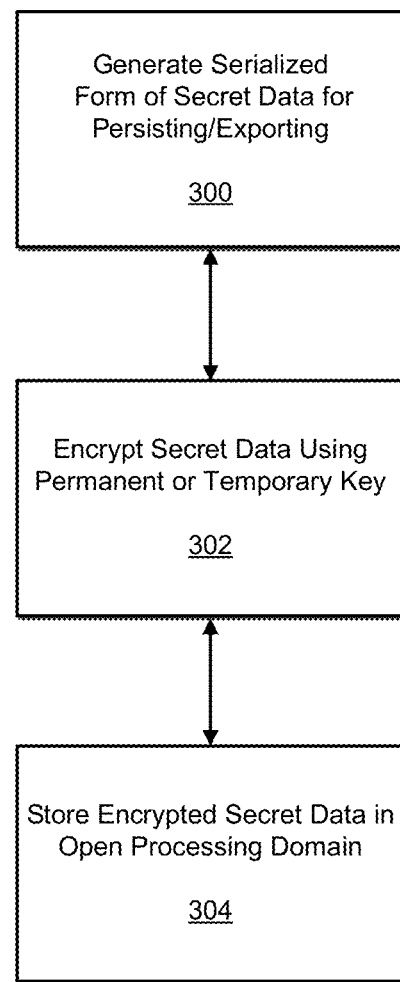
FIG. 3 illustrates a method for persisting and exporting secret data consistent with embodiments of the present disclosure.

FIG. 3 illustrates a method for persisting and exporting secret data consistent with embodiments of the present disclosure. To persist or export an SKB_SecureData object, the SKB_SecureData object can be serialized 300 within a protected processing domain (e.g., within the SKB). To ensure that secret data is not exposed in the clear, the serialized SKB_SecureData object may then be encrypted 302 using either a permanent or a temporary cryptographic key. For example, if secret data is to be persisted for use after a reboot, a permanent key (e.g., the Master Key 112 or a derivative thereof) may be used to encrypt the SKB_SecureData object. If the secret data needs to be persisted for use after a reboot, a temporary cryptographic key (e.g., a transient export key) may be used to encrypt the SKB_SecureData object. Once encrypted, the encrypted form of the secret data may be transferred out of the secure processing domain (e.g., the SKB) and stored in the open 304. If the secret data needs to be utilized again, it can be loaded back into the secure processing domain (i.e., loaded back into the SKB), and decrypted using the appropriate cryptographic key.

SKB_Cipher

An SKB_Cipher object may encapsulate attributes and parameters used to perform cryptographic operations on SKB_SecureData objects. Particularly, SKB_Cipher objects may be called by client applications through the SKB API 130 to encrypt or decrypt data. In some embodiments, an SKB_Cipher object may be created by calling an appropriate SKB_Engine. Methods relating to SKB_Cipher objects may include:

| | |
|---|---|
| SKB_Cipher_ProcessBuffer | Outputs the result of performing a cipher operation on a specified buffer of data |
| SKB_Cipher_Release | Releases a SKB_Cipher object |

When an SKB_Engine is called to create an SKB_Cipher object, the calling application may indicate whether the cipher operation is an encryption or a decryption operation, the relevant encryption/decryption algorithm, any flags indicating cipher usage, any parameters required by the algorithm, the SKB_SecureData holding the encryption or decryption key used by the SKB_Cipher method, and/or the address of a pointer that the method will set to refer to the SKB-Cipher object that is created.

SKB_Transform

An SKB_Transform object may be called by a client application through the SKB API 130 to perform operations on secret data included in a secure processing domain, such as calculating a digest, signing data, or verifying a signature and returning a result to a client application. Methods relating to SKB_Transform objects may include:

| | |
|---|---|
| SKB_Transform_AddBytes | Adds caller-supplied bytes to the transform |
| SKB-Transform_AddSecureData | Adds the payload of an SKB-SecureData object to the transform |
| SKB_Transform_GetOutput | Retrieves the result of the transform |
| SKB_Transform_Release | Releases the SKB_Transform object |

The SKB_Transform object may encapsulate attributes and parameters to perform cryptographic operations on and with SKB_SecureData objects. In one embodiment, the SKB_Transform supports any of the cryptographic operations described above. Using the SKB_Transform and SKB_SecureData objects, the underlying SKB API 130 implementation may operate on secret data as desired using the integral security functions of the secure processor 104 and/or the secure processing domain.

Cloaking SKB_SecureData

The SKB API 130 may support cloaking fields within an SKB_SecureData object. In some embodiments, SKB_Data_Cloak methods may provide mechanisms to process encrypted data that ensconces other secrets. The cloaking mechanism may ensure that secrets continue to be protected by the SKB while enabling a client application operating in the open processing domain to process the decrypted (e.g., encapsulating) data structure. For example, an application may need to process encrypted complex XML content that contains keys or other secrets within child elements. However, merely decrypting the encrypted XML and returning the plaintext to the application would expose these encapsulated secrets.

In some embodiments, cloaked data represents secret data that appears inside a data structure that is cloaked in-place before the data structure is returned to a calling client application executing in an open processing domain. This enables the caller to parse the public part of the data structure and extract the cloaked fields from it in order to feed them back to the SKB API 130 for performing secure operations. In this manner, the value of the cloaked or secret fields in the data structure may not be revealed to the calling application operating and the security of the secret data contained in these fields is preserved.

Figure 4:
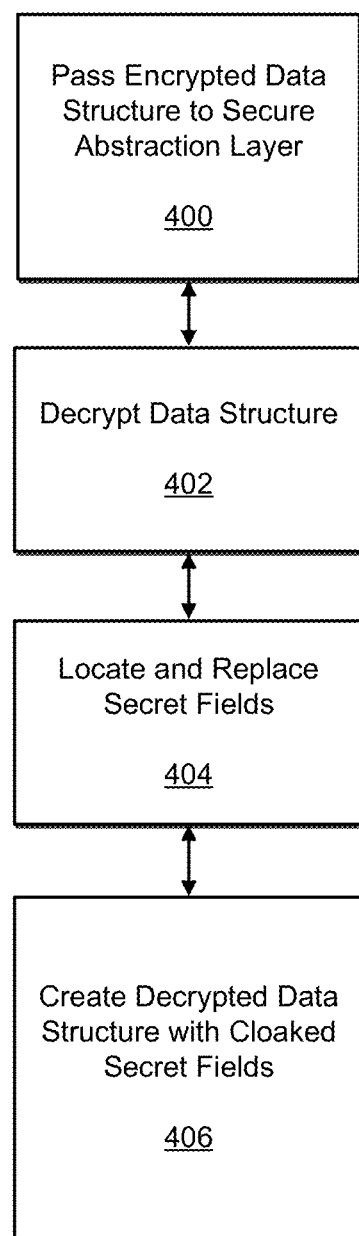
FIG. 4. illustrates a method of performing cloaking operations consistent with embodiments of the present disclosure.

FIG. 4. illustrates a method of performing cloaking operations consistent with embodiments of the present disclosure. As illustrated, cloaking operations work generally as follows:

(a) The calling application passes an encrypted data structure containing secret fields 400.
(b) The SKB decrypts this data structure 402, locates the secret fields, and replaces them in-situ (no size change) with a new field containing enough information for the SKB to reconstruct or regain access to this secret data later 404.
(c) The application obtains the decrypted data structure with the cloaked fields. It can parse and process this data structure and calls the SKB API 130 to create an SKB_Data object for the cloaked secrets 406.

The client application can now have the SKB perform any operations and transformations on the decrypted data structure that require use of the cloaked secret data.

Figure 5:
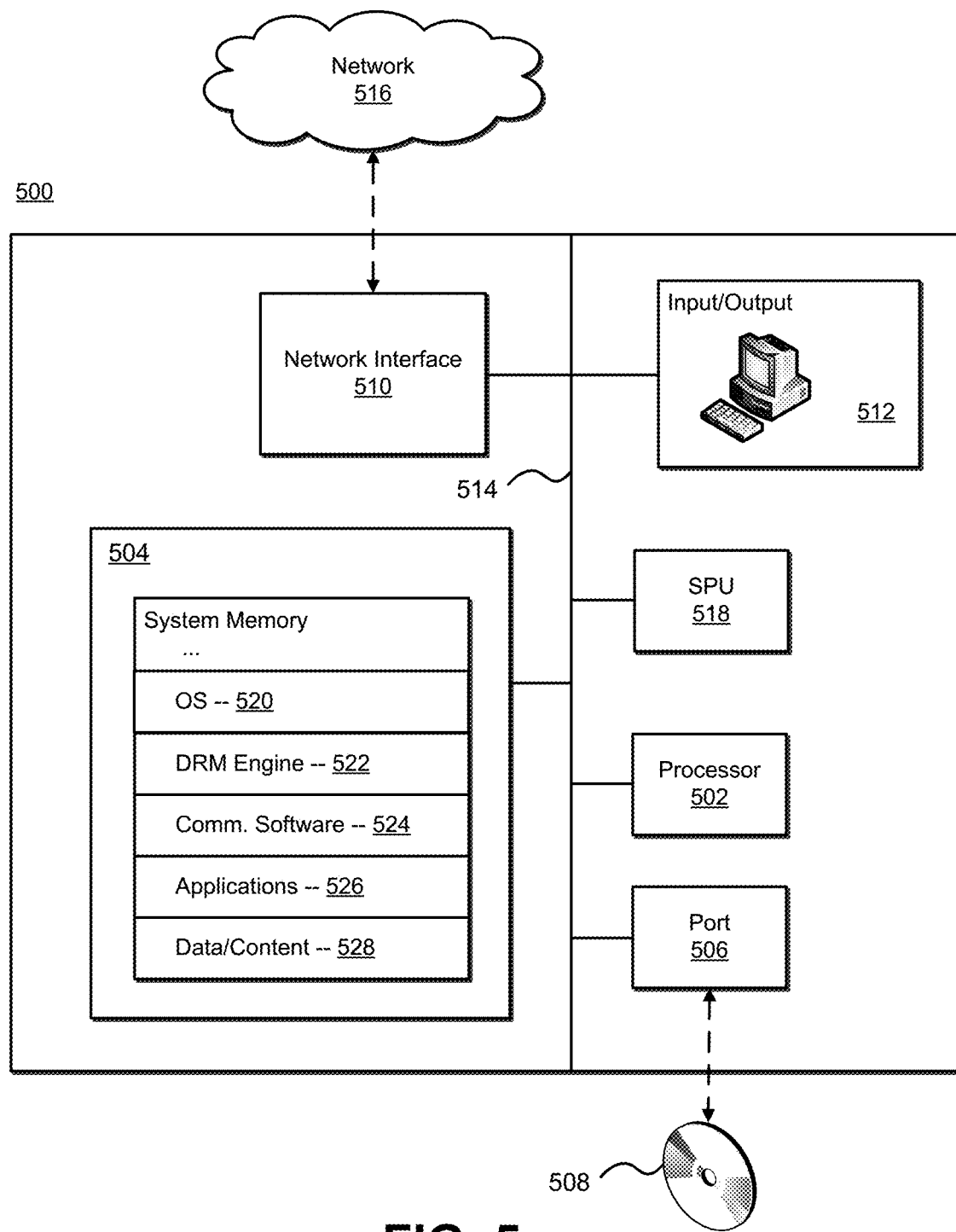
FIG. 5 illustrates an exemplary computer system for implementing embodiments of the present disclosure.

FIG. 5 illustrates an exemplary system 500 that may be used to implement embodiments of the systems and methods disclosed herein. While the disclosed systems and methods may be integrated in a SoC architecture, embodiments of the same may also be included in any suitable computer system. For example, embodiments of the systems and methods may be integrated in a computer system having virtual open and secure processing environments.

The exemplary system 500 may comprise a general purpose computing device such as a personal computer or a network server, or a specialized computing device such as a cellular telephone, personal digital assistance, portable audio or video player, television set-top box, kiosk, gaming system, other embedded device, or the like. As illustrated in FIG. 5, the system 500 may include: a processing unit 502; system memory 504, which may include high speed random access memory (RAM), non-volatile memory (ROM), and/or one or more bulk non-volatile computer-readable storage mediums (e.g., a hard disk, flash memory, etc.) for storing programs and other data for use and execution by the processing unit 502; a port 506 for interfacing with removable memory 508 that may include one or more diskettes, optical storage mediums (flash memory, thumb drives, USB dongles, compact discs, DVDs, etc) and/or other computer-readable storage mediums; a network interface 510 for communicating with other systems via a network 516 such as, for example, the Internet, a local area network, a virtual private network, and the like using one or more communication technologies (e.g., wireless, Ethernet, and/or the like); a user interface 512 that may include a display and/or one or more input devices such as, for example, a touchscreen, a keyboard, a mouse, a track pad, and the like; and one or more busses 514 for communicatively coupling the elements of the system 500.

In some embodiments, the system 500 may, alternatively or in addition, include a secure processing unit ("SPU") 518 that is protected from tampering by a user of system 500 or other entities by utilizing secure physical and/or virtual security techniques. An SPU 518 can help enhance the security of sensitive operations such as key management, signature verification, and other aspects of the digital rights management process. In certain embodiments, the SPU 518 may operate in a logically secure processing domain and be configured to protect and operate on secret information as described herein. In some embodiments, the SPU 518 may include internal memory storing executable instructions or programs configured to enable to the SPU 518 to perform secure operations as described herein.

The operation of the system 500 may be generally controlled by a processing unit 502 and/or 518 operating by executing software instructions and programs stored in the system memory 504 (and/or other computer-readable media, such as removable memory 508). The system memory 504 may store a variety of executable programs or modules for controlling the operation of the system 500. For example, the system memory 504 may include an OS 520 that may manage and coordinate in part system hardware resources and provide for common services for execution of various applications and a DRM engine 522 for implementing DRM functionality. The system memory 504 may further include communication software 524 configured to enable in part communication within and by the system 500, applications 526 (e.g., media applications), and data and/or content 528.

The systems and methods disclosed herein are not inherently related to any particular computer or other apparatus and may be implemented by a suitable combination of hardware, software, and/or firmware. Software implementations may include one or more computer programs comprising executable code/instructions that, when executed by a processor, may cause the processor to perform a method defined at least in part by the executable instructions. The computer program can be written in any form of programming language, including compiled or interpreted languages, and can be deployed in any form, including as a standalone program or as a module, component, subroutine, or other unit suitable for use in a computing environment. Further, a computer program can be deployed to be executed on one computer or on multiple computers at one site or distributed across multiple sites and interconnected by a communication network. Software embodiments may be implemented as a computer program product that comprises a non-transitory storage medium configured to store computer programs and instructions, that when executed by a processor, are configured to cause the processor to perform a method according to the instructions. In certain embodiments, the non-transitory storage medium may take any form capable of storing processor-readable instructions on a non-transitory storage medium. A non-transitory storage medium may be embodied by a compact disk, digital-video disk, a magnetic tape, a Bernoulli drive, a magnetic disk, a punch card, flash memory, integrated circuits, or any other non-transitory digital processing apparatus memory device.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered as illustrative and not restrictive, and the invention is not to be limited to the details given herein, but may be modified within the scope and equivalents of the appended claims.

Appendix A—Example Code

An illustrative example of code implementing an SKB API consistent with embodiments of the present disclosure is provided below:

```
/** Secure Key Box **/
#ifndef _SKB_SECURE_KEY_BOX_H_
#define _SKB_SECURE_KEY_BOX_H_
#define SKB_API_VERSION_MAJOR              0
#define SKB_API_VERSION_MINOR              1
#define SKB_API_VERSION_REVISION           0
#define SKB_API_VERSION_STRING             "0.1.0"
#define SKB_DATA_FLAG_KEY_USAGE_UNWRAP     1 /*<< Can be used to unwrap wrapped data*/
#define SKB_DATA_FLAG_KEY_USAGE_ENCRYPTION 2 /*<< Can be used with an SKB_Cipher for encryption */
#define SKB_DATA_FLAG_KEY_USAGE_DECRYPTION 4 /*<< Can be used with an SKB_Cipher for decryption */
#define SKB_DATA_FLAG_EXTERNAL_DATA        8 /*<< Data comes from external cleartext */
#define SKB_SUCCESS 0
#define SKB_FAILURE (-1)
#define SKB_ERROR_BASE (-80000)
#define SKB_ERROR_INTERNAL                 ((SKB_ERROR_BASE) - 1)
#define SKB_ERROR_INVALID_PARAMETERS       ((SKB_ERROR_BASE) - 2)
#define SKB_ERROR_NOT_SUPPORTED            ((SKB_ERROR_BASE) - 3)
#define SKB_ERROR_OUT_OF_RESOURCES         ((SKB_ERROR_BASE) - 4)
#define SKB_ERROR_BUFFER_TOO_SMALL         ((SKB_ERROR_BASE) - 5)
typedef int SKB_Result;
typedef unsigned char SKB_Byte;
typedef unsigned int SKB_Size;
typedef struct {
  struct {
    unsigned int major;
    unsigned int minor;
    unsigned int revision;
  } api_version;
  const char* name;
  unsigned int flags;
} SKB_EngineInfo;
typedef enum {
  SKB_DATA_TYPE_BYTES,
  SKB_DATA_TYPE_SYMMETRIC_KEY,
  SKB_DATA_TYPE_RSA_PRIVATE_KEY,
  SKB_DATA_TYPE_RSA_PUBLIC_KEY,
  SKB_DATA_TYPE_DH_PUBLIC_KEY,
  SKB_DATA_TYPE_DH_PRIVATE_KEY
```

```
} SKB_DataType;
typedef struct {
  SKB_DataType type;            /** Data type */
  unsigned int flags;           /** Data flags */
} SKB_DataInfo;
typedef enum {
  SKB_TRANSFORM_TYPE_DIGEST_SHA1,
  SKB_TRANSFORM_TYPE_DIGEST_SHA256,
  SKB_TRANSFORM_TYPE_DIGEST_MD5,
  SKB_TRANSFORM_TYPE_TLS_RECORD
} SKB_TransformType;
typedef enum {
  SKB_CIPHER_ALGORITHM_NULL,
  SKB_CIPHER_ALGORITHM_AES_128_ECB,
  SKB_CIPHER_ALGORITHM_AES_128_CBC,
  SKB_CIPHER_ALGORITHM_AES_128_CTR,
  SKB_CIPHER_ALGORITHM_RSA_1_5,
  SKB_CIPHER_ALGORITHM_RSA_OAEP
} SKB_CipherAlgorithm;
typedef enum {
  SKB_CIPHER_DIRECTION_ENCRYPT,
  SKB_CIPHER_DIRECTION_DECRYPT
} SKB_CipherDirection;
typedef enum {
  SKB_DATA_FORMAT_RAW,
  SKB_DATA_FORMAT_PKCS8
} SKB_DataFormat;
#if defined(__cplusplus)
extern "C" {
#endif
/** @defgroup SKB_Datan SKB_Data Class * @{ */
/**An SKB_Data object represents secret data that cannot be accessed directly by the caller. Secret
data is typed: it can represent cipher keys as well as arbitrary byte sequences.**/
typedef struct SKB_Datan SKB_Data;
/** An SKB_Transform object represents a data transform. The purpose of such transforms is to be able
to transform data supplied by the caller as well as secret data and return to the caller the output
of the transform, which does not reveal any of the secret data used as input to the transform. **/
typedef struct SKB_Transform SKB_Transform;
/An SKB_Cipher object can encrypt or decrypt data supplied by the caller./
typedef struct SKB_Cipher SKB_Cipher;
/** @defgroup SKB_Cloak SKB_Cloak Class * @{ */
/*An SKB_Cloak object manages cloaked data. Cloaked data is secret data that appears inside a data
structure and cloaked in-place before the data structure is returned to the caller. This enables the
caller to parse the public part of the data structure and extract the cloaked fields from it in order
to feed them back to the engine and obtain a data object in return. This way, the value of the secret
fields in the data structure is never revealed to the caller.*/
typedef struct SKB_Cloak SKB_Cloak;
/** @defgroup SKB_Engine SKB_Engine Class * @{ */
/**An SKB_Engine object represents an instance of an engine that can manage and operate n secret data
that cannot be accessed by the caller.**/
typedef struct SKB_Engine SKB_Engine;
/** Obtain an engine instance. This instance can be released by calling SKB_Engine_Release when no
longer needed. **/
SKB_Result
SKB_GetEngine(SKB_Engine** engine);
/** Release an SKB_Engine object. The object can no longer be used by the caller after this call
returns. All SKB_Data objects returned by this engine can be released before
calling this method. @param self The SKB_Engine to release. **/
SKB_Result
SKB_Engine_Release(SKB_Engine* self);
SKB_Result
SKB_Engine_GetInfo(const SKB_Engine* self, SKB_EngineInfo* info);
/**Obtain a named data object from an SKB_Engine object. @param self The SKB_Engine to obtain the
data object from. @param name The name of the data object to obtain. @param data Address of a
pointer to an SKB_Data object where the object pointer will be returned. @result SKB_SUCCESS if the
data object was found, SKB_ERROR_NO_SUCH_ITEM if no such data object exists, or another error code if
the call could not be completed successfully. **/
SKB_Result
SKB_Engine_GetDataByName(SKB_Engine* self, const char* name, SKB_Data** data);
```

```
SKB_Result
SKB_Engine_CreateDataFromWrapped(SKB_Engine*            self,
                                 const SKB_Byte*        wrapped,
                                 SKB_Size               wrapped_size,
                                 SKB_DataType           wrapped_type,
                                 SKB_DataFormat         wrapped_format,
                                 SKB_CipherAlgorithm    wrapping_algorithm,
                                 const SKB_Data*        wrapping_key,
                                 SKB_Data**             data);
SKB_Result
SKB_Engine_CreateDataFromExported(SKB_Engine*           self,
                                  const SKB_Byte*       exported,
                                  SKB_Size              exported_size,
                                  SKB_Data**            data);
SKB_Result
SKB_Engine_CreateDataFromFrozen(SKB_Engine*             self,
                                const SKB_Byte*         frozen,
                                SKB_Size                frozen_size,
                                SKB_Data**              data);
/**Create an SKB_Data object with random bytes. The object will have the data type
SKB_DATA_TYPE_BYTES. **/
SKB_Result
SKB_Engine_CreateDataFromRandom(SKB_Engine*             self,
                                SKB_Size                size,
                                SKB_Data**              data);
/**Creates an SKB_Transform object **/
SKB_Result
SKB_Engine_CreateTransform(SKB_Engine*                  self,
                           SKB_TransformType            type,
                           void*                        params,
                           SKB_Transform**              transform);
/** Creates an SKB_Cipher object **/
SKB_Result
SKB_Engine_CreateCipher(SKB_Engine*                     self,
                        SKB_CipherAlgorithm             type,
                        SKB_CipherDirection             direction,
                        SKB_Data*                       key,
                        SKB_Cipher**                    cipher);
/** @ingroup SKB_Cloak            @{ */
SKB_Result
SKB_Cloak_CreateData(SKB_Cloak*                         self,
                     const SKB_Byte*                    cloaked_data,
                     SKB_Size                           cloaked_data_size,
                     SKB_Data**                         data);
SKB_Result
SKB_Cloak_Release(SKB_Cloak* self);
/** @ingroup SKB_Data * @{ */
/**Release an SKB_Data object. The object can no longer be used by the caller after this call
returns. @param self The SKB_Data to release.**/
SKB_Result
SKB_Data_Release(SKB_Data* self);
/**Get information about the data represented by an SKB_Data object. @param self The SKB_Data whose
info is obtained. **/
SKB_Result
SKB_Data_GetInfo(const SKB_Data* self, SKB_DataInfo* info);
/**Get the exported serialized payload of an SKB_Data object. Data in an exported form can be stored
and reloaded at a later time in the the same or different SKB_Engine, as long as the SKB_Engines are
considered to be compatible (they can share some common state, which typically does not persist
across a CPU or security processor shutdown or reset.) @param self The SKB_Data whose frozen
serialized payload is obtained. @param buffer Memory buffer where the exported data is to be
written. The memory buffer must be large enough to hold the number of bytes specified by the
buffer_size parameter. If buffer_size points to a zero value, this parameter may be NULL. @param
buffer_size Pointer to the size of the memory buffer. This parameter is in/out: the caller sets the
value pointed to to the size of the memory buffer, and upon return the value pointed to will be equal
to the number of bytes written (or the number of bytes that would be written, if the value passed was
too small). @return SKB_SUCCESS if the call succeeds, SKB_ERROR_BUFFER_TOO_SMALL if there is not
enough space in the buffer to write the exported data, or a different error code if some other
failure occurred. **/
SKB_Result
SKB_Data_Export(const SKB_Data* self, SKB_Byte* buffer, SKB_Size* buffer_size);
/**Get the frozen serialized payload of an SKB_Data object. Data in a frozen form can be stored and
reloaded at a later time in the the same or different SKB_Engine instance, even after a complete
shutdown or reset of the CPU or security processor. @param self The SKB_Data whose frozen serialized
payload is obtained. * */
SKB_Result
SKB_Data_Freeze(const SKB_Data* self, SKB_Byte* buffer, SKB_Size* buffer_size);
/** Get the cloaked payload of an SKB_Data object and an SKB_Cloak object that can be used
subsequently to uncloak the data. Only data of the following types can be cloaked: SKB_DATA_TYPE_XXX
* @param self The SKB_Data whose cloaked payload is obtained. */
```

```
SKB_Result
SKB_Data_Cloak(const SKB_Data* self, SKB_Byte* buffer, SKB_Cloak** cloak);
/** @ingroup SKB_Transform @{ **/
/** Adds caller-supplied bytes to the transform **/
SKB_Result
SKB_Transform_AddBytes(SKB_Transform*          self,
                       const SKB_Byte*zzzz     data,
                       SKB_Size                data_size);
/**Adds the contents of a data object to the transform. Only data objects of the following types can
be used: SKB_DATA_TYPE_BYTES * SKB_DATA_TYPE_SYMMETRIC_KEY **/
SKB_Result
SKB_Transform_AddData(SKB_Transform* self, const SKB_Data* data);
/Gets the output size of the transform/
SKB_Size
SKB_Transform_GetOutputSize(const SKB_Transform* self);
/Get the output of the transform/
SKB_Result
SKB_Transform_GetOutput(SKB_Transform* self, SKB_Byte* output);
SKB_Result
SKB_Transform_Release(SKB_Transform* self);
/** @ingroup SKB_Cipher **/
SKB_Result
SKB_Cipher_ProcessBuffer(SKB_Cipher*        self,
                         const SKB_Byte*    in_buffer,
                         SKB_Size           in_buffer_size,
                         SKB_Byte*          out_buffer,
                         SKB_Size*          out_buffer_size,
                         unsigned int       flags);
SKB_Result
SKB_Cipher_Release(SKB_Cipher* self);
#if defined(__cplusplus)
}
#endif
#endif /* _SKB_SECURE_KEY_BOX_H_ */
```

What is claimed is:

1. A non-transitory computer-readable storage medium storing instructions that, when executed by at least one processor of a system, cause the system to perform a method comprising:
receiving, by a secure abstraction layer of the system from an application executing within a first processing domain of the system, one or more first requests to invoke a secure processing domain of the system to perform one or more operations using secret data within the secure processing domain, the secure processing domain being different, at least in part, than the first processing domain;
generating, by the secure abstraction layer, one or more second requests, the one or more second requests being configured to cause the secure processing domain of the system to perform at least one cryptographic operation using the secret data;
issuing, by the secure abstraction layer, the one or more second requests to the secure processing domain;
receiving, by the secure abstraction layer from the secure processing domain in response to the one or more second requests, one or more responses, the one or more responses comprising second data, the second data being generated by the secure processing domain at least in part by performing the at least one cryptographic operation using the secret data; and
sending, to the application executing within the first processing domain from the secure abstraction layer, the second data.

2. The non-transitory computer-readable storage medium of claim 1, wherein the secure processing domain comprises a secure hardware environment.

3. The non-transitory computer-readable storage medium of claim 2, wherein the secure processing domain comprises a secure processing unit.

4. The non-transitory computer-readable storage medium of claim 1, wherein the secure processing domain comprises a secure software environment.

5. The non-transitory computer-readable storage medium of claim 1, wherein the secure processing domain comprises a white-box cryptographic module.

6. The non-transitory computer-readable storage medium of claim 1, wherein the secret data is protected from disclosure outside the secure processing domain by the secure processing domain.

7. The non-transitory computer-readable storage medium of claim 1, wherein the secret data comprises a key.

8. The non-transitory computer-readable storage medium of claim 7, wherein the at least one cryptographic operation comprises a cryptographic signature operation.

9. The non-transitory computer-readable storage medium of claim 8, wherein the one or more first requests further comprise first data and wherein the cryptographic signature operation comprises cryptographically signing the first data using the key to generate cryptographically signed first data.

10. The non-transitory computer-readable storage medium of claim 7, wherein the at least one cryptographic operation comprises an encryption operation.

11. The non-transitory computer-readable storage medium of claim 10, wherein the one or more first requests further comprise first data and wherein the encryption operation comprises encrypting the first data using the key.

12. The non-transitory computer-readable storage medium of claim 7, wherein the at least one cryptographic operation comprises a decryption operation.

13. The non-transitory computer-readable storage medium of claim 12, wherein the one or more first requests further comprise first data and wherein the decryption operation comprises decrypting the first data using the key.

14. The non-transitory computer-readable storage medium of claim 1, wherein the at least one cryptographic operation comprises a digest calculation operation.

15. The non-transitory computer-readable storage medium of claim 1, wherein the at least one cryptographic operation comprises generation of a secure data object.

16. The non-transitory computer-readable storage medium of claim 1, wherein the secure abstraction layer is trusted by the system.

17. The non-transitory computer-readable storage medium of claim 16, wherein the secure abstraction layer is trusted by the system based on verifying a digital signature associated with the secure abstraction layer.

18. The non-transitory computer-readable storage medium of claim 16, wherein the secure abstraction layer is trusted by the system based on verifying that the secure abstraction layer is trusted during a secure boot process of the system.

* * * * *